United States Patent
Gindele et al.

(10) Patent No.: US 6,873,442 B1
(45) Date of Patent: Mar. 29, 2005

(54) METHOD AND SYSTEM FOR GENERATING A LOW RESOLUTION IMAGE FROM A SPARSELY SAMPLED EXTENDED DYNAMIC RANGE IMAGE SENSING DEVICE

(75) Inventors: Edward B. Gindele, Rochester, NY (US); Andrew C. Gallagher, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 878 days.

(21) Appl. No.: 09/707,635

(22) Filed: Nov. 7, 2000

(51) Int. Cl.[7] .............................................. H04N 1/40
(52) U.S. Cl. ...................... 358/471; 358/1.2; 358/506; 348/302; 348/308; 348/229.1; 250/208.1
(58) Field of Search ................... 358/471, 1.2, 501, 358/506, 518, 520, 500, 513, 512, 909.1; 348/241, 242, 299.1, 302, 308, 229.1, 294, 297; 250/208.1

(56) References Cited

U.S. PATENT DOCUMENTS

| | | | |
|---|---|---|---|
| 3,971,065 A | 7/1976 | Bayer | |
| 4,667,092 A | 5/1987 | Ishihara | |
| 4,945,406 A | 7/1990 | Cok | |
| 5,189,511 A | 2/1993 | Parulski et al. | |
| 5,221,848 A | * 6/1993 | Milch | 250/559.02 |
| 5,247,366 A | * 9/1993 | Ginosar et al. | 348/256 |
| 5,300,381 A | 4/1994 | Buhr et al. | |
| 5,418,565 A | 5/1995 | Smith | |
| 5,652,621 A | 7/1997 | Adams, Jr. et al. | |
| 6,040,858 A | * 3/2000 | Ikeda | 348/242 |
| 6,480,226 B1 | * 11/2002 | Takahashi et al. | 348/296 |
| 6,646,246 B1 | * 11/2003 | Gindele et al. | 250/208.1 |
| 6,734,913 B1 | * 5/2004 | Motta | 348/362 |

FOREIGN PATENT DOCUMENTS

EP         1 173 010 A2     1/2002

OTHER PUBLICATIONS

U.S. Ser. No. 09/615,398 filed Jul. 13, 2000 by Gallagher et al.

* cited by examiner

*Primary Examiner*—Kimberly Williams
*Assistant Examiner*—Negussie Worku
(74) *Attorney, Agent, or Firm*—Thomas H. Close

(57) ABSTRACT

A method of producing a low resolution image from a sparsely sampled extended dynamic range digital image, including the steps of: providing a sparsely sampled extended dynamic range image sensing device having fast photosites with a predetermined response to light exposure interspersed with slow photosites with a slower response to the same light exposure; using the image sensor to produce a sparsely sampled high resolution digital image having fast pixel values produced by the fast photosites and slow pixel values produced by the slow photosites; and constructing a low resolution digital image from the sparsely sampled high resolution digital image by using only slow pixel values or only fast pixel values from the sparsely sampled high resolution digital image.

33 Claims, 9 Drawing Sheets

| i\j | 0 | 1 | 2 | 3 |
|---|---|---|---|---|
| 0 | g* | g* | g* | g* |
| 1 | g* | g* | g* | g* |
| 2 | g* | g* | g* | g* |
| 3 | g* | g* | g* | g* |

FIG. 10B

| i\j | 0 | 1 | 2 | 3 |
|---|---|---|---|---|
| 0 |  | r* |  | r* |
| 1 | r* |  | r* |  |
| 2 |  | r* |  | r* |
| 3 | r* |  | r* |  |

FIG. 10C

| i\j | 0 | 1 | 2 | 3 |
|---|---|---|---|---|
| 0 | b* |  | b* |  |
| 1 |  | b* |  | b* |
| 2 | b* |  | b* |  |
| 3 |  | b* |  | b* |

METHOD AND SYSTEM FOR GENERATING A LOW RESOLUTION IMAGE FROM A SPARSELY SAMPLED EXTENDED DYNAMIC RANGE IMAGE SENSING DEVICE

FIELD OF THE INVENTION

The invention relates generally to the field of image capture, and more specifically to a method of generating a low resolution image from an image captured with an extended dynamic range image sensing device.

BACKGROUND OF THE INVENTION

Image sensing devices, such as a charge-coupled device (CCD), are commonly found in such products as digital cameras, scanners, and video cameras. These image sensing devices have a limited dynamic range when compared to traditional photographic film products. A typical electronic image sensing device has a dynamic range of about 7 stops. This means that the exposure for a typical scene must be determined with a fair amount of accuracy in order to avoid clipping the resultant signal. By contrast, natural scenes often exhibit a dynamic range of 9 stops and higher. This is mainly a consequence of multiple light sources with widely varying intensities illuminating the scene objects. Specular highlights also contribute to the dynamic range of natural scenes.

Electronic sensors used to scan photographic film must also contend with a high dynamic range of signal intensities. In U.S. Pat. No. 5,221,848 issued Jun. 22, 1993 to Milch entitled High Dynamic Range Film Digitizer and Method of Operating the Same discloses a method and apparatus designed to extend the dynamic range of an electronic image sensor. Aimed primarily for scanning photographic film, Milch teaches a method of a one pass film scanner using a charge-coupled device scanner having a plurality of linear arrays having the same spectral sensitivity. One of the arrays has a faster response to light than the other array. The information from the two arrays is then combined and digitized forming an extended dynamic range digital image.

Digital electronic cameras employ a single image sensor with a color filter array (CFA) to produce a sparsely sampled digital image. A typical color filter array pattern is disclosed in U.S. Pat. No. 3,971,065 issued Jul. 20, 1976 to Bayer entitled Color Imaging Array. Interpolation algorithms are employed to produce a full resolution color image from the sparsely sampled image. Digital cameras also need to record scenes having a high dynamic range. One way to obtain a high dynamic range image from a digital camera is to employ a high bit depth analog to digital converter in the camera. Another way is to employ an image sensor having interspersed fast and slow photosites as disclosed in copending U.S. Ser. No. 09/615,398 filed Jul. 13, 2000 by Gallagher et al. which is incorporated herein by reference. Also an important feature of digital cameras is the need to produce digital images with different spatial resolution. This is primarily due to the limited on board memory of the digital camera and due to the limitations in bandwidth for transferring the digital images to other devices sparsely sampled extended dynamic range digital images.

In U.S. Pat. No. 4,945,406 issued Jul. 31, 1990 to Cok et al. entitled Apparatus and Accompanying Methods for Achieving Automatic Color Balancing in a Film to Video Transfer System disclose a method of producing a low resolution image from a high resolution image. The method disclosed therein is used for extended dynamic range digital images derived from scanning photographic images from film. The film is a wide dynamic range sensor that inherently compresses the dynamic range of the scene so that the scanner can recover the wide dynamic range image. While the method disclosed by Cok et al. is a general method applicable to electronically captured digital images, the method does not work well with sparsely sampled extended dynamic range digital images.

Therefore, there exists a need for an improved method of producing low resolution images from sparsely sampled extended dynamic range digital images.

SUMMARY OF THE INVENTION

The need is met according to the present invention by providing a method of producing a low resolution image from a sparsely sampled extended dynamic range digital image, including the steps of: providing a sparsely sampled extended dynamic range image sensing device having fast photosites with a predetermined response to light exposure interspersed with slow photosites with a slower response to the same light exposure; using the image sensor to produce a sparsely sampled high resolution digital image having fast pixel values produced by the fast photosites and slow pixel values produced by the slow photosites; and constructing a low resolution digital image from the sparsely sampled high resolution digital image by using only slow pixel values or only fast pixel values from the sparsely sampled high resolution digital image.

ADVANTAGES

The present invention has the advantages of producing a low resolution image from the high resolution extended dynamic range image in a computationally efficient manner. It is a further advantage that when only the slow pixel values are used, saturation artifacts in the low resolution image can be minimized, and when only the fast pixel values are used, noise artifacts in the low resolution image can be minimized.

BRIEF DESCRIPTION OF THE DRAWINGS

FIG. 7A illustrates the arrangement of slow photosites and fast photosites on a panchromatic image sensing device;

FIG. 7B illustrates the arrangement of slow photosites and fast photosites on a color image sensing device;

FIG. 10A illustrates the low resolution arrangement of sampled pixels corresponding to green sensitive slow photosites;

FIG. 10B illustrates the low resolution arrangement of sampled pixels corresponding to red sensitive slow photosites;

FIG. 10C illustrates the low resolution arrangement of sampled pixels corresponding to blue sensitive slow photosites.

DETAILED DESCRIPTION OF THE INVENTION

A digital image is comprised of a one or more digital image channels. Each digital image channel is comprised of a two-dimensional array of pixels. Each pixel value relates to the amount of light received by an imaging capture device corresponding to the geometrical domain of the pixel. For color imaging applications a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image for any of the above mentioned applications.

Although the present invention describes a digital image channel as a two dimensional array of pixel values arranged by rows and columns, those skilled in the art will recognize that the present invention can be applied to mosaic (non rectilinear) arrays with equal effect.

Imaging devices employing electronic sensors are well known, therefore the present description will be directed in particular to elements forming part of, or cooperating more directly with, apparatus in accordance with the present invention. Elements not specifically shown or described herein may be selected from those known in the art. Note that as used herein, the term image is a two dimensional array of values. An image may be a two dimensional subset of another image.

The present invention can be implemented using a programmed digital computer or custom integrated digital image processing circuitry. It is well within the skill of programming art to produce such a computer program based on the disclosure provided below. The computer can be a general purpose digital computer, such as a personal computer, or a special purpose digital computer specifically designed for processing digital images.

Figure 1:
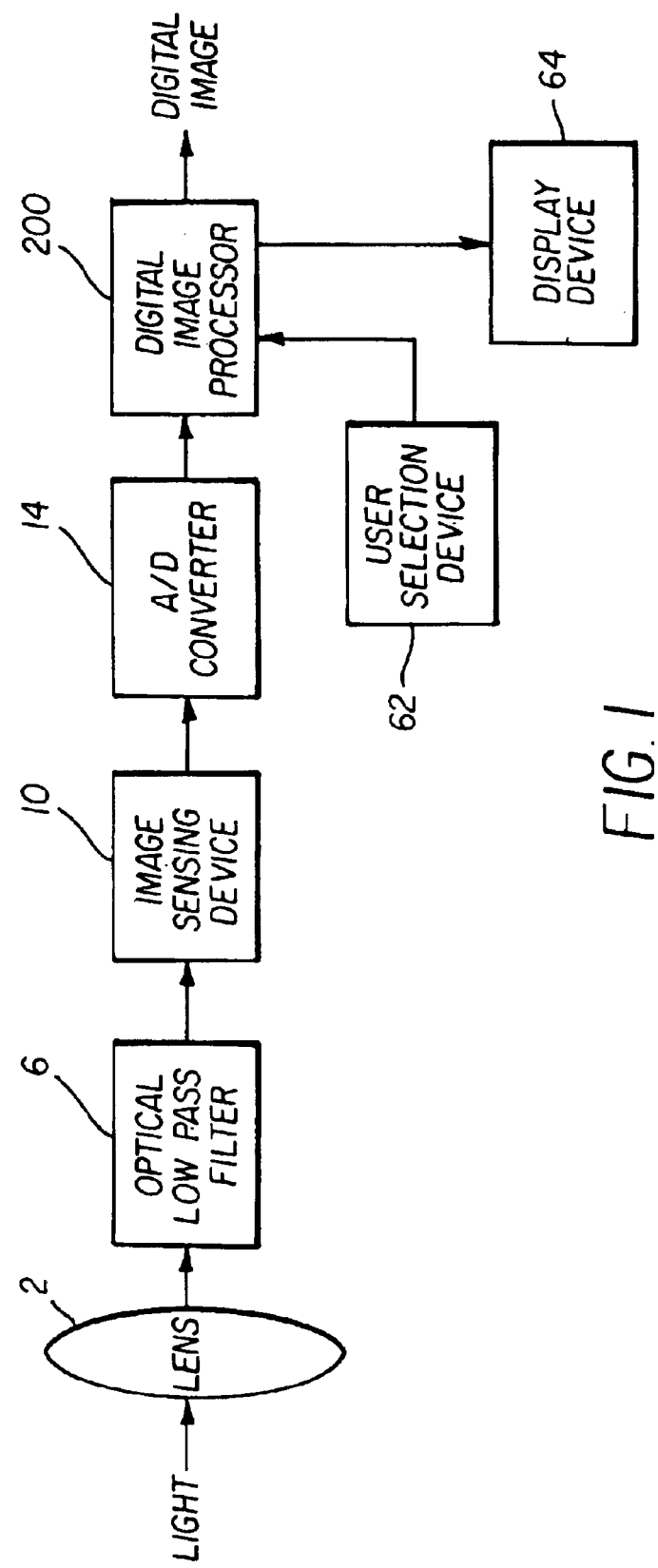
FIG. 1 is a block diagram of a digital imaging system utilizing an extended-range image sensing device and a digital image processor according to the invention.

The essential elements employed in the practice of the present invention are shown as a functional block diagram in FIG. 1. Light from an object or scene is incident upon a lens 2, forming a photographic image on the image sensing device 10 such as a charged-coupled device (CCD) with a color filter array (CFA). Note that other devices, such as CMOS devices, may be used as the image sensing device 10. The image sensing device 10 is a sparsely sampled, extended dynamic range image sensing device as will be described in further detail below. An optical low pass filter 6, placed between the lens 2 and the image sensing device 10 performs a slight blurring of the imaged light in order to reduce the occurrence of aliasing. An A/D converter 14 receives the voltage signal corresponding to the imaged light from the image sensing device 10 and produces an image signal corresponding to the voltage signal. The digital image processor 200 receives the image signal from the A/D converter 14, modifies the image signal and produces a digital image. More than one form of digital image can be produced as the output from the digital image processor 200. The user of the digital imaging system can make selections, with the user selection device 62, with regard to the system resolution mode. For example, the user can select a high resolution digital image, a low resolution digital image, or paxelized digital image as the output from the digital image processor. In addition, the user can make selections between different options with regard to the computation speed and fidelity of results when selecting low resolution and paxelized digital images. The user also can select enhancement processing to be performed on any of the possible output digital images such that the resultant enhanced digital images are viewable on a display device 64. The present invention can be implemented within a digital camera. For this digital imaging system application an enhanced digital image derived from a paxelized digital image is displayed on a liquid crystal display device (LCD) as a component of the digital camera.

The A/D converter 14 shown in FIG. 1 converts the voltage signal produced by the image sensing device 10 into a image signal, i.e. a stream of digital pixel values corresponding to the voltage signal produced by the photosites of the image sensing device 10. More specifically, the A/D converter 14 converts the voltage signal, nearly linear with respect to the intensity of the incident light, from the image sensing device 10 to a discrete digital image signal, e.g. a 10 bit signal where the linear encoded values range from 0 to 1023. The A/D converter 14 may also perform processing to convert the linear code value domain image signal to a nonlinear code value domain image signal, such as an 8 bit logarithmic signal as is commonly performed in the art. For example, the following equation can be used to convert a 10 bit linear image signal a(x,y), where (x,y) specifies the row and column index of the signal location with reference to the image sensing device 10, into an 8 bit logarithmic image signal b(x,y):

$$b(x, y) = \begin{cases} 0 & 0 \leq a(x, y) \leq 31 \\ 73.5975 \ln a(x, y) - 255 & 32 \leq a(x, y) \leq 1024 \end{cases} \quad (1)$$

Note that each stop of exposure (in the linear response region of the image sensing device) results in a doubling of the linear image signal a(x,y) and results in an increase of the logarithmically encoded image signal b(x,y) by 51. In this case, the value 51 represents the number of code values per stop (cvs) of exposure.

Figure 2:
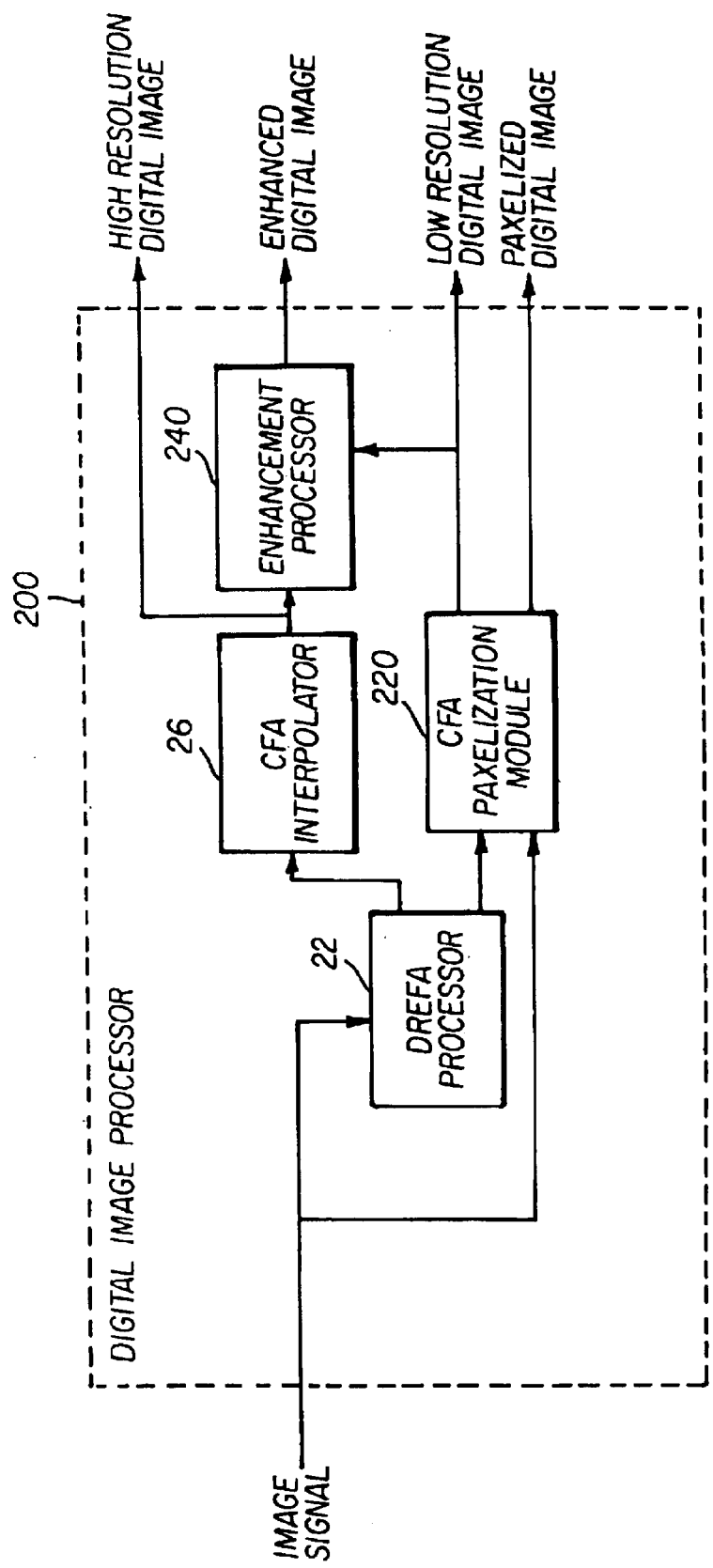
FIG. 2 is a functional block diagram of the digital image processor.

The digital image processor 200 shown in FIG. 1 is illustrated in more detail in FIG. 2. The image signal is received by the dynamic range extending filter array (DREFA) processor 22. The DREFA processor 22 processes the image signal by expanding the dynamic range of the image and interpolating the sample values. The DREFA processor 22 then transmits the modified image signal to the CFA interpolator 26 where the color values are interpolated to provide a color value at each pixel. The output of the CFA interpolator 26 is a high resolution digital image. The CFA paxelization module 220 also receives the image signal and produces a paxelized digital image, i.e. a low resolution digital image derived from the image signal. Optionally, the high resolution digital image is also received by an enhancement processor 240 which receives the paxelized digital image, calculates enhancements based on the paxelized digital image and applies the enhancements to the pixels of the high resolution digital image to generate an enhanced digital image.

The purpose of the CFA interpolator 26 is to generate a full description of the color for each location of the sensed photographic image. In the preferred embodiment, the image sensing device 10 consists of an array of photosensitive elements called photosites. Each photosite is typically coated with either a red, green, or blue filter, as described by Bayer in commonly assigned U.S. Pat. No. 3,971,065, which is incorporated herein by reference. The Bayer array is a color filter array in which green filters are located in a checkerboard pattern over the photosites with red and blue filter alternating line by line to fill the interstices of the checkerboard pattern; this produces twice as many green filter sites as either red or blue filter sites. Note that the method described herein may be easily extended to color filter arrays with different arrangements of the primaries, a different number of primaries, or a different set of primaries. Thus, in the preferred embodiment, each photosite is sensitive to either red, green, or blue light. However, it is desirable to obtain a pixel value corresponding to an exposure for each of the red, green, and blue exposures at each photosite location. The pixel values of the image signal constitute a sparsely sampled image having red, green and blue pixel values at neighboring pixel locations. The CFA digital image is an example of a sparsely sampled digital image.

In this description, "red", "green", and "blue" represent the primary spectral sensitivities of an image sensing device 10, as is well known in the art of image processing. The CFA interpolator 26 generates from the image signal output from the A/D converter 14 an interpolated image signal consisting of a pixel value corresponding to the color primaries for each photosite. For example, if a particular photosite is coated with a red filter, then the A/D converter 14 outputs a red pixel value for that photosite since the red filter essentially blocks green and blue light from that particular photosite. The CFA interpolator 26 calculates a green pixel value and blue pixel value for the corresponding photosite even though the corresponding photosite does not respond to green and blue light. Similarly, the CFA interpolator 26 calculates a green pixel value and a red pixel value corresponding to the blue photosites, as well as a red pixel value and blue pixel value corresponding to the green photosites.

Generally, the CFA interpolator 26 operates by considering the pixel values of the corresponding photosite and the pixel values of associated surrounding photosites. While any commonly known interpolator may be used, a description of a preferred CFA interpolator is disclosed in. U.S. Pat. No. 5,652,621 issued Jul. 29, 1997 to Adams, Jr. et al. entitled Adaptive Color Plane Interpolation in Single Sensor Color Electronic Camera which is incorporated herein by reference. Adams et al. describe an apparatus for processing a digitized image signal obtained from an image sensor having color photosites aligned in rows and columns that generate at least three separate color values but only one color value for each photosite location, and a structure for interpolating color values for each photosite location so that it has three different color values. The apparatus generates an appropriate color value missing from a photosite location by the interpolation of an additional color value for such photosite locations from color values of different colors than the missing color value at nearby photosite locations. The apparatus also obtains Laplacian second-order values, gradient values and color difference bias values in at least two image directions from the pixel values corresponding to nearby photosites of the same column and row and selects a preferred orientation for the interpolation of the missing color value based upon a classifier developed from these values. Finally, the missing color pixel value from nearby multiple color pixel values is selected to agree with the preferred orientation.

The image signal output from the A/D converter 14 is received by the DREFA processor 22 which expands the dynamic range of the image signal. In the preferred embodiment, the dynamic range of the image sensing device 10 is expanded by selecting certain photosites of the image sensing device 10 to have a slow response. The arrangement of the selected photosites with respect to the image sensing device 10 will be discussed in greater detail hereinbelow. In the preferred embodiment, the responses of selected photosites are slowed, or retarded, by altering the gain of the selected photosites, herein referred to as slow photosites. Altering the gain of a photosite is commonly practiced in the art of digital camera design and manufacture.

Figure 3:
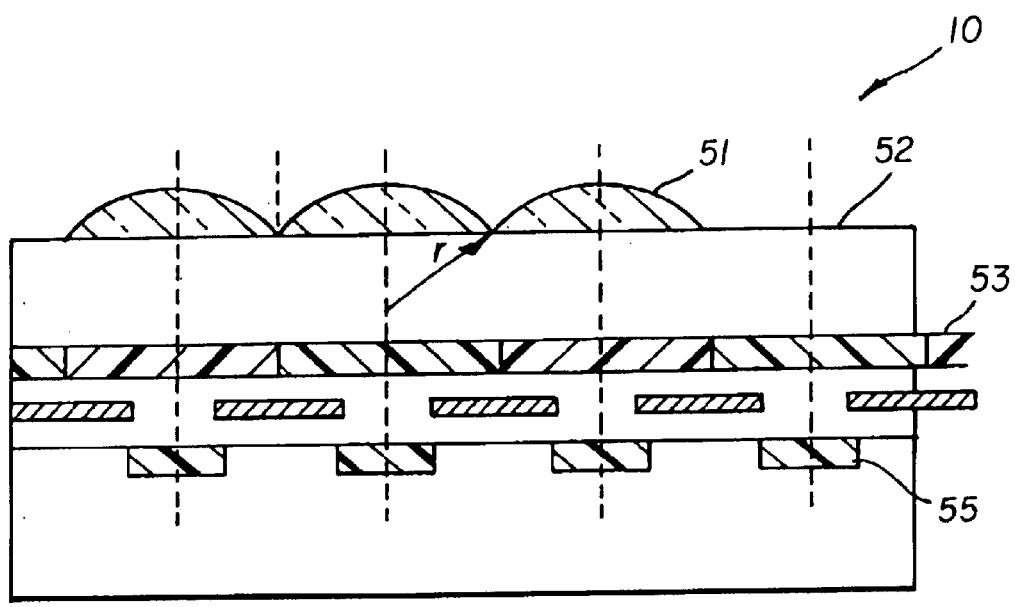
FIG. 3 is a cross-section of an interline image sensor employing an array of lenslets to alter the response of selected photosites.

With reference to FIG. 3, it is a common practice in the art of image sensor manufacture to place resin lenslets 51 on top of each photosite. For example, particularly when the image sensing device 10 is an interline solid state image sensing device, one lenslet technique is described in U.S. Pat. No. 4,667,092 issued May 19, 1987 to Ishihara entitled Solid-State Image Device with Resin Lens and Resin Contact Layer, which is incorporated herein by reference. Ishihara discloses a solid-state image device which includes an image storage block having a block surface and a plurality of storage elements are embedded along the block surface to store an image in the form of electric charge. An overlying layer is deposited to form an array of optical lenses in correspondence to the storage elements. An intermediate layer is laid between the block surface and the overlying layer. Incident light focuses through the lenses and the intermediate layer onto the storage elements. The intermediate layer serves as an adjusting layer for adjusting a focal length.

FIG. 3 shows a cross section of an interline solid state image sensing device. Without the lenslets 51, the signal readout area associated with each photosensitive area 55 of a photosite makes it impossible to use the whole area of the semiconductor substrate as the photoelectric transducer area. The conventional solid-state image device does not effectively utilize all incident rays thereon and therefore has low sensitivity. The addition of a resin lenslet 51 on top of a photosite allows the incident rays of light to be focused on the photoactive areas of the photosite, thereby more effectively utilizing the incident rays of light and increasing the sensitivity of the photosite. Thus, by varying the size and/or efficiency of the lenslet 51, the sensitivity (gain) of the photosite may be easily altered. Thus, for interline devices and for CMOS sensors the preferred method of altering the gain of the photosite is by altering the lenslet 51 placed on top of the photosite. As shown in FIG. 3, the location 52 has no lenslet, and therefore fewer incident rays of light are incident with the photosensitive area. Alternatively, a lenslet could be manufactured at location 52 with a different radius, shape, size or material as compared with the lenslet 51, thereby structured to be less efficient at focusing incident rays of light onto the photosensitive area 55 than is the lenslet 51. Those skilled in the art will recognize that if the lenslet 51 focuses 80% of the incident rays of light onto a photosensitive area 55 and the location 52 having no lenslets (or alternatively slow lenslets) allows 20% of the incident rays of light onto a photosensitive area 55, then the photosite covered by lenslet 51 is 2 stops faster than the location 52. In this case, the lenslet 51 is used for fast photosites and no lenslet is used for slow photosites, as represented by location 52.

Figure 4:
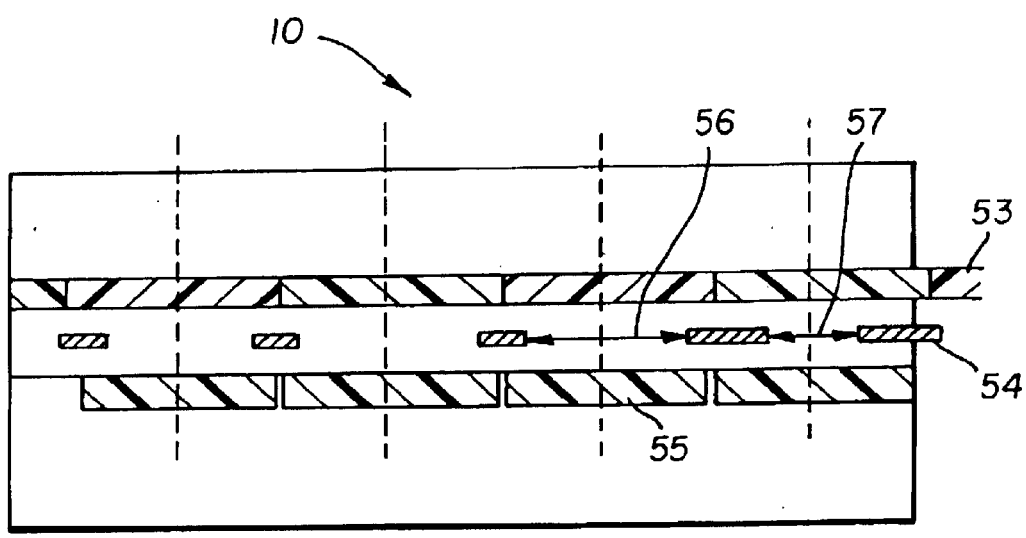
FIG. 4 is a cross-section of a full frame image sensor employing a metal mask to alter the response of selected photosites.

With reference to FIG. 4 showing a cross section of a full frame image sensing device 10, in the case where the image sensing device 10 is a full frame device, light rays incident to the photosensitive area 55 of a photosite must pass through an aperture of a light shield, typically made from metal, which is shown in cross-section in FIG. 4 to comprise light blocking mask portions 54 and large and small apertures 56 and 57 interspersed among the light blocking portions. In the preferred embodiment, the gain of photosites may be altered by modifying the light blocking mask portion 54. The sensitivity of the photosite is then directly related to the aperture of the light blocking mask portion 54. For example, one photosite with an aperture 50% of the size of a second photosites aperture will have a response of 50% compared to that on the second photosite. For example, a large aperture 56 of a light blocking mask portion 54 allows 80% of the light rays incident upon that photosite to pass through, but a small aperture 57 allows only 20% of the incident light rays to pass. Those skilled in the art will recognize that the photosite with the large aperture 56 is 2 stops faster than a photosite with the small aperture 57. In this case, the large aperture 56 is used for fast photosites, and the small aperture 57 is used for the slow photosites. Thus, the aperture of the light blocking mask may be modified to adjust the response of the selected photosites. The Eastman Kodak Company makes full frame image sensing devices with a metal mask light shield that reduces the pixel active area of all pixels from about 80% to about 20% (for dithered scanner applications where the sensor is moved by ½ the pixel spacing horizontally and vertically, and 4 pictures are taken). The invention thus involves utilizing such mask technology, but with different sized apertures, to provide an image sensor with a differential response to image light.

Figure 5:
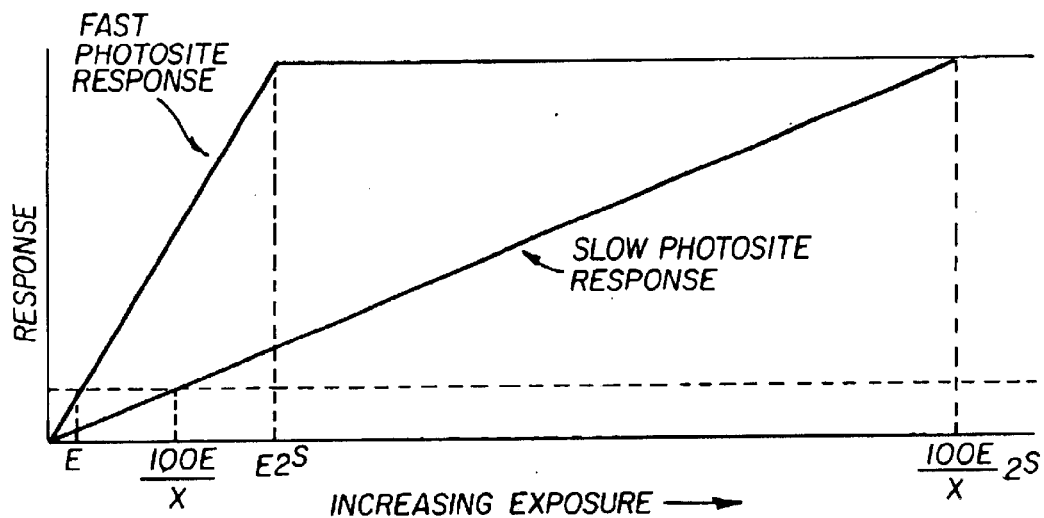
FIG. 5 is a graph illustrating the response of a fast photosite and a slow photosite.

In the preferred embodiment, the response of the selected slow photosites is X % (where X<=100) that of fast photosites for the same exposure, as shown graphically in FIG. 5. In this preferred embodiment, the selected photosites have a response that is slowed by two stops (−log X/100) relative to the fast photosites, resulting in X=25. Thus, the image sensing device 10 consists of multiple sets of photosites, fast photosites and slow photosites. The collection of the output responses of the fast photosites constitutes a sparsely sampled fast digital image, i.e. a sparsely sampled version of a scene sensed with the fast photosites. Likewise, the collection of the output responses of the slow photosites constitutes a sparsely sampled slow digital image, i.e. a sparsely sampled version of a scene sensed with the slow photosites.

Figure 6:
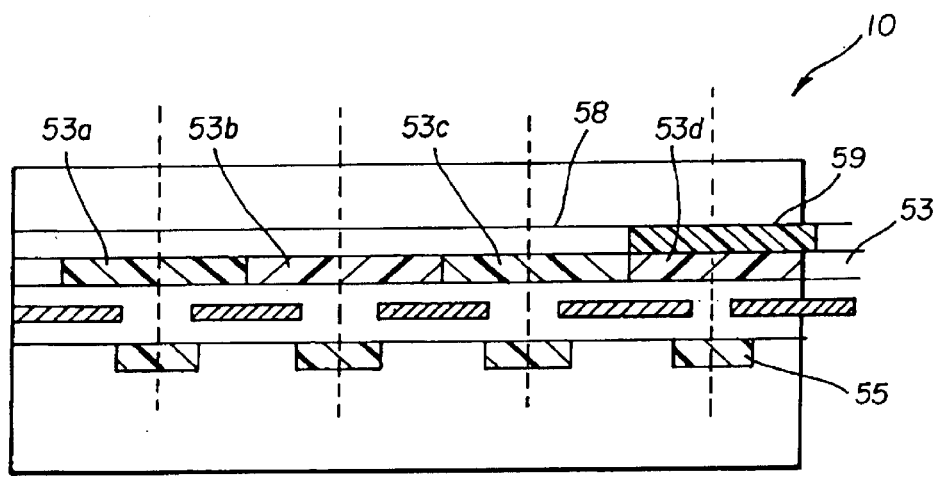
FIG. 6 is a cross-section of an image sensor employing an array of neutral density filters to alter the response of selected photosites.

As another alternative, the responses of the selected slow photosites can be slowed by the use of a neutral filter coating the photosite. FIG. 6 shows a cross section of an image sensing device with a color filter array 53. Note that the color filter array 53a is red, 53b is green, 53c is red, and 53d is green. A layer of neutral filters 58 is contained above the color filter array 53, although the position of the layer of neutral filters 58 and the color filter array 53 does not matter. Note that the layer of neutral filters 58 only contains a neutral filter at the positions of selected photosites, as indicated by the neutral filter 59. In this case, the layer of neutral filters 58 is transparent or nearly transparent for fast photosites and contains a neutral filter 59 for slow photosites. For example, if the neutral filter 59 consists of a material that allows X % transmission of light, then the response of that slow photosite will be slowed by $$-\log_2\left(\frac{X}{100}\right)$$

stops relative to the response of the fast photosite.

The DREFA processor 22 shown in FIG. 2 is described in more detail hereinbelow. The purpose of the DREFA processor 22 is to create an image signal with an increased dynamic range by processing the input image signal while accounting for the difference in photo response of the fast and slow photosites. Accordingly, the output of the DREFA processor 22 is an expanded image signal having increased numerical dynamic range. This expanded image signal is then input to the CFA interpolator 26 for processing as previously described.

It is not a requirement of the present invention that the A/D converter 14 and the DREFA processor 22 be directly connected. The DREFA processor 22 may reside in hardware or software in close proximity to the A/D converter 14 and image sensing device 10. For example, the DREFA processor 22 could reside directly within a digital camera. However, the DREFA processor 22 may also be remote from the image sensing device 10. For example, the image signal output from the A/D converter 14 can be transmitted (after compression) via a wire or wireless connection to a personal computing device, printer, or remote server to apply to operation of the DREFA processor 22. Transmission of the image signal may also include file transfer protocol or email. Additionally, payment via credit card or some other means may be required by the DREFA processor 22 from the user.

Figures 7A, 7B:
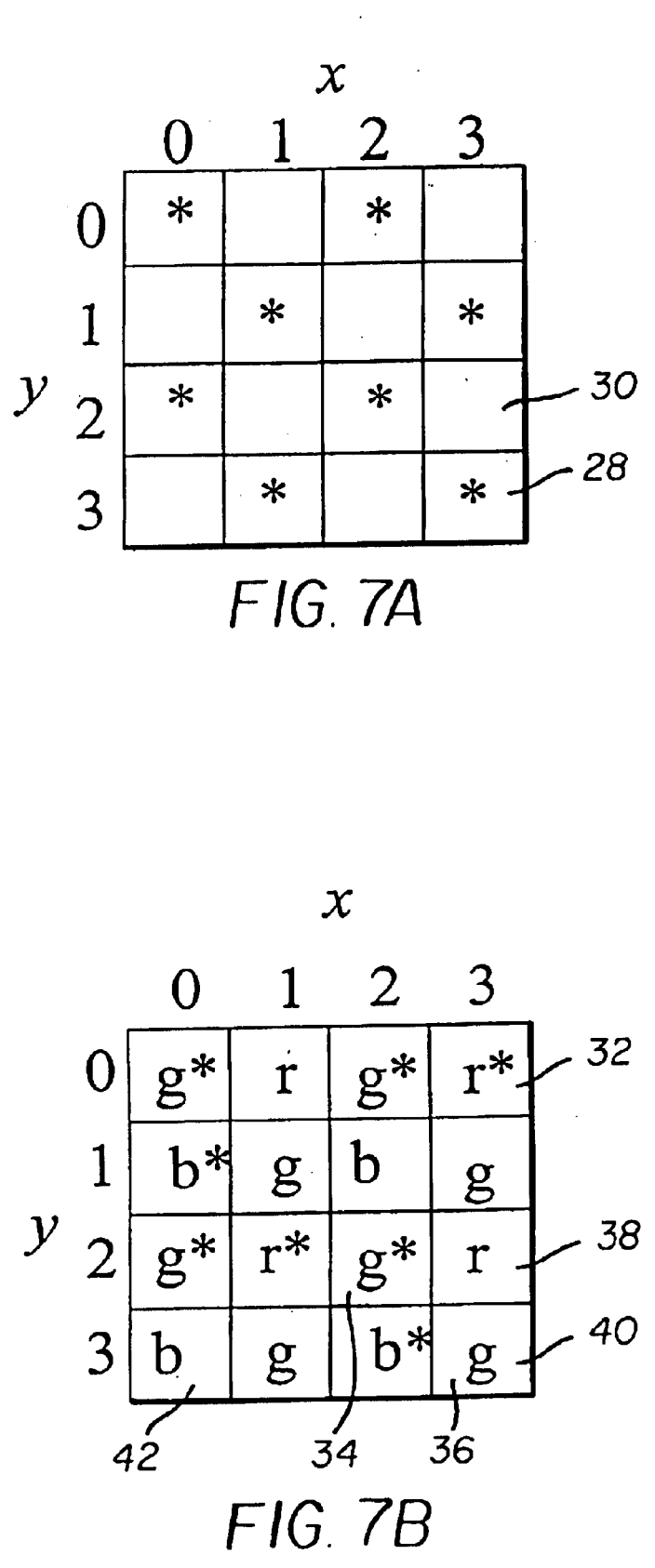

In the preferred embodiment, 50% of the photosites of the image sensing device 10 are selected to have slow response. Those skilled in the art will recognize that varying the percentage of photosites which have slow response will still result in the advantages of the present invention. In the case of an image sensing device 10 in which all photosites have approximately equivalent spectral sensitivity (i.e. a panchromatic image sensing device), FIG. 7A shows an arrangement of the slow photosites that will result in approximately 50% of all the photosites of the image sensing device 10 being of slow response. The photosites 28 with slow response are marked with an asterisk (*), while the photosites 30 having fast response are blank. A sparsely sampled image was previously defined as an image that was captured with an image sensing device having a color filter array. According to the present invention, the term sparsely sampled is also intended to refer to an image produced by an image sensor such as that shown in FIG. 7A where the fast and slow photosites are interspersed.

FIG. 7B shows an arrangement for a color image sensor wherein 50% of each photosite type (red, green, or blue sensitive) has slow response. For example, the photosites 32, 34, and 36 are red, green and blue photosites, respectively, having slow responses, the photosites 38, 40 and 42 are red, green and blue photosites, respectively, having fast response.

Note that FIGS. 7A and 7B imply a regular pattern for the location of the slow photosites. While it is preferable that the slow photosites are arranged in a regular pattern, it is by no means necessary. The slow photosites could be arranged randomly or semi-randomly over the surface of the image sensing device 10, and their location would be stored in some place accessible to the DREFA processor 22.

Referring to FIG. 5, the response of a fast photosite to a certain exposure and the response of a slow photosite to the same exposure are shown. Note that if a level of noise n is superimposed on the response, it can easily be seen that the fast photosite will yield a valid signal with lower exposures (beginning at exposure level E) than will the slow photosite (which yields valid signal beginning at $$\frac{100}{X}E.$$

Alternatively, data from the slow photosite will be valid for higher exposure levels (up to signal level of $$\frac{100}{X}E2^S,$$

where S is the inherent dynamic range of a single photosite, typically S may be about 5 stops) than would the fast photosite (which produces valid response up to an exposure of $E2^S$.) Note that both the fast photosite and the slow photosite have the same range of response in stops of exposure (S), but the response of the slow photosites is preferably $$-\log_2\left(\frac{X}{100}\right)$$

stops slower than the fast photosites, as shown in FIG. 5. It is preferred that the responses of the fast and slow photosites overlap with respect to exposure. That is, it is preferred that $$-\log_2\left(\frac{X}{100}\right) < S.$$

The overall dynamic range of the image sensing device 10, considering both fast and slow photosites, is $$S - \log_2\left(\frac{X}{100}\right).$$

In the case of the preferred embodiment, where S=5 and X=25, the overall effective dynamic range of the image sensing device 10 is 7 stops of exposure.

The DREFA processor 22 may be utilized to extend the overall dynamic range of the digital images produced with the present invention by using the pixel values corresponding to slow photosites to reconstruct the image signals in regions corresponding to very high exposures. Likewise, the DREFA processor 22 also uses the pixel values corresponding to photosites with fast response to reconstruct the image signal corresponding to very low exposures.

Figure 8:
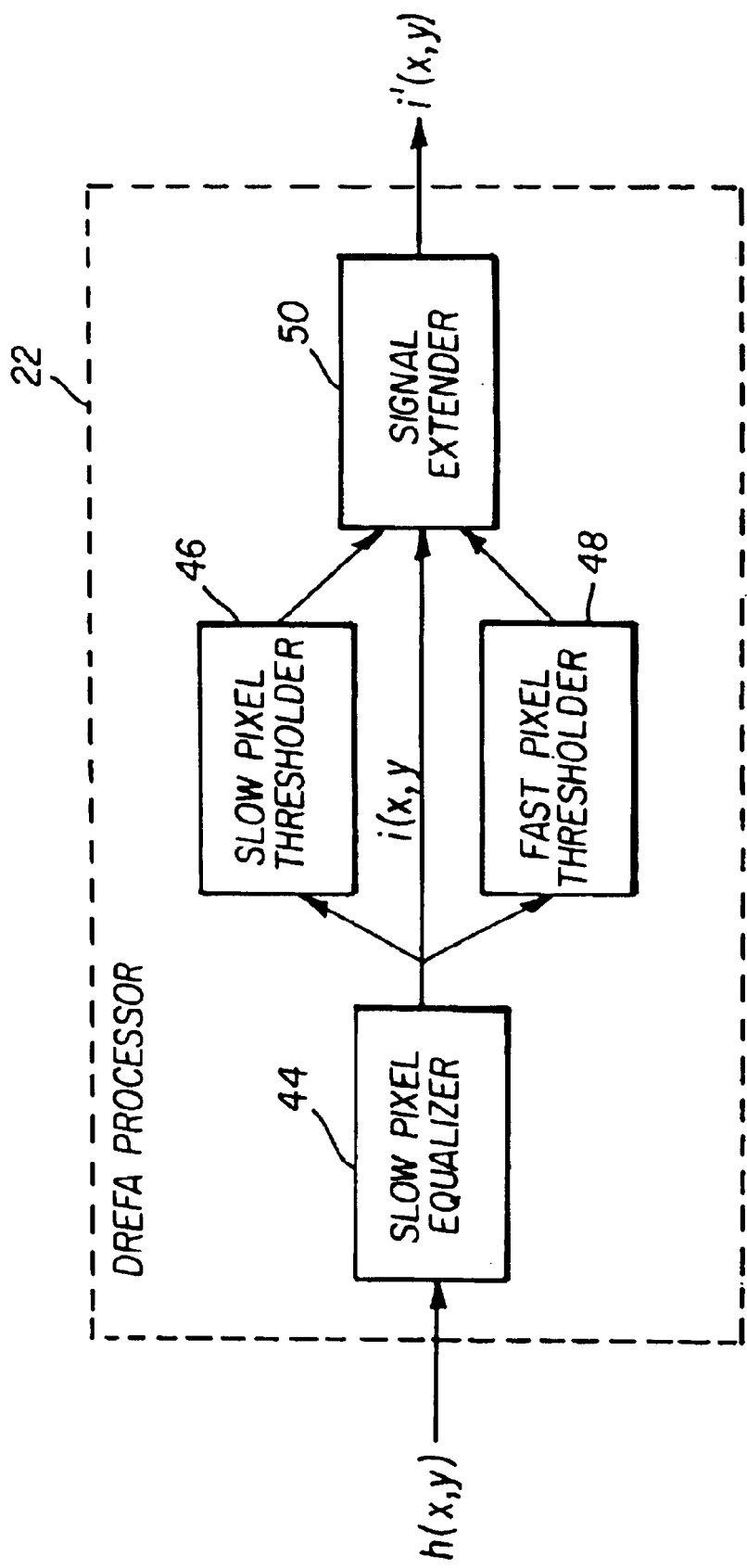
FIG. 8 Shows an exploded block diagram of the dynamic range extending filter array (DREFA) processor.

FIG. 8 shows an exploded block diagram of the DREFA processor 22. The logarithmic image signal b(x,y) output from the A/D converter 14 is passed to the slow pixel equalizer 44. The purpose of the slow pixel equalizer 44 is to compensate the image signal corresponding to slow photosites by accounting for the offset in response by X stops. Alternatively, the fast pixels can be equalized to the slow pixels by adjusting the fast pixels in the opposite direction. In the preferred embodiment, the image signal corresponding to the slow photosites are incremented by the quantity −cvs log (X/100), where cvs is the number of code values per stop of exposure. In the preferred embodiment, the quantity cvs is 51. Alternatively, if the image signal input to the slow pixel equalizer 44 is linearly related to exposure (rather than logarithmically), then the slow pixel equalizer 44 scales the image signal corresponding to the slow photosites by a factor of 100/X. Note that it is assumed that the locations of the slow photosites are known to the slow pixel equalizer 44. The output of the slow pixel equalizer 44 is an image signal i(x,y) that has been compensated at the locations of corresponding to slow photosites for the difference between the slow photosite response in relation to the fast photosite response. At the locations corresponding to fast photosites, the value of the image signal b(x,y) output from the A/D converter 14 is identical to the value of the image signal i(x,y) output from the slow pixel equalizer 44. Note that the image signal i(x,y) is not limited to an 8 bit range. In the preferred embodiment, the value of i(x,y) ranges from 0 to 357 (i.e. 9 bits).

Next, the image signal i(x,y) output from the slow pixel equalizer 44 is input to a slow pixel thresholder 46. The purpose of the slow pixel thresholder 46 is to determine slow pixel values that are of low quality due to a photosite not receiving enough photons to produce a valid signal. The pixel value at these (x,y) locations is then replaced in processing performed by the signal extender 50 by calculating a new pixel value based upon nearby fast pixel values. All slow pixel values which are less than a predetermined threshold are considered to be problem pixel values. In the case of the slow pixel values, this predetermined threshold is referred to as the low exposure response threshold. Thus, a pixel value i(x,y) is considered to be a problem if it is a slow photosite and if:

$$i(x,y) < T_1 \qquad (2)$$

where $T_1$ is predetermined. In the preferred embodiment, the value of $T_1$ is given by $$T_1 = -cvs\log_2\left(\frac{X}{100}\right), \qquad (3)$$

which in the preferred embodiment is set to a value of 102. Note that the threshold $T_1$ may be dependent upon the color sensitivity of the photosite at location (x,y). Slow pixel values that are problems are referred to as noise pixels, since the value of i(x,y) is not sufficiently above the noise level of the image sensing device to be useful.

Likewise, the image signal i(x,y) output from the slow pixel equalizer 44 is input to a fast pixel thresholder 48. The purpose of the fast pixel thresholder 48 is to determine fast pixels that are of low quality. The pixel values at these locations is then replaced by calculating a new pixel value based upon nearby slow pixel values in processing performed by the signal extender 50, which will be described in detail hereinbelow. All fast pixel values that are greater than a predetermined threshold value are considered to be problem pixels. In the case of the fast pixels, this predetermined threshold used for the purpose of detecting problem fast pixels is referred to as the high exposure response threshold. Thus, a fast pixel value i(x,y) is considered to be a problem if:

$$i(x,y) > T_2 \qquad (4)$$

where $T_2$ is a predetermined threshold. In the preferred embodiment, the value of $T_2$ is set to a value of 254. Note that the threshold $T_2$ may be dependent upon the color of the photosite at location (x,y). Fast photosites that are problem locations are referred to as saturated pixels, since the value of i(x,y) is as high as possible at these locations.

The (x,y) locations of the problem slow pixels determined by the slow pixel thresholder 46 and the (x,y) locations of the problem fast pixels determined by the fast pixel thresholder 48 are input to the signal extender 50. In addition, the image signal i(x,y) output from the slow pixel equalizer 44 is also input to the signal extender 50. The purpose of the signal extender 50 is to replace the image signal i(x,y) values at problem locations (x,y) with estimates of the signal herein referred to as replacement values, had the inherent dynamic range of each photosite of the image sensing device 10 been greater. If the problem location is coincident with a slow photosite, then the replacement value is calculated from neighboring image signal pixel values coincident with fast photosites. In this embodiment, the term "neighboring" refers to a certain spatial distance. In the preferred embodiment, the photosites neighboring a selected photosite are those photosites within a distance of 2 photosites of the selected photosite. Likewise, if the problem location is coincident with a fast photosite, then the replacement value is calculated from neighboring image signal values coincident with slow photosites. In the preferred embodiment, the color of the photosite at the problem photosite is also taken into account. The replacement value for any problem location is preferably determined only by the signal originating from neighboring photosites of the same color. The output of the signal extender 50 is an image signal i'(x,y) having a dynamic range as if captured by an image sensing device 10 having photosites with inherent dynamic range of $$S = -\log_2\left(\frac{X}{100}\right) \quad (5)$$

rather than the actual inherent dynamic range of S for each photosite of the image sensing device 10. Note that for all (x,y) locations that are not problem locations, the value of i'(x,y) is equivalent to i(x,y).

As an example of the processing performed by the signal extender 50 for the Bayer CFA pattern shown in FIG. 7B, if location (x,y) is a problem location, and (x,y) is the location that corresponds to a green photosite (such as photosite 34 in FIG. 7B), then the replacement value i'(x,y) for the image signal i(x,y) is calculated in the following manner:

$$i'(x,y)=0.25*[i(x-1,y-1)+i(x+1,y-1)+i(x-1,y+1)+i(x+1,y+1)] \quad (6)$$

Note that signal values that the calculation of i'(x,y) is dependent upon, are expected to comply with certain requirements. For example, suppose that (x,y) is a problem location and (x,y) corresponds to a green photosite with slow response. Then the signal levels of neighboring photosites are used to calculate replacement value i'(x,y). However, this assumes that the signal values of each of the neighboring photosites are also less than $T_3$. In the preferred embodiment, $T_3 = T_1$. For each neighboring photosite that this is not the case, that signal level is omitted from the calculation of the replacement value i'(x,y). For example, if i(x−1, y−1)>$T_3$, then the value i'(x,y) is calculated with the following formula:

$$i'(x,y)=1/3*[i(x+1,y-1)+i(x-1,y+1)+i(x+1,y+1)] \quad (7)$$

Generally, the interpolation scheme for determining a replacement value at problem location (x,y), where the location (x,y) corresponds to a green photosite which is also a fast photosite on a image sensing device having a Bayer pattern filter array is given with the following equation:

$$i'(x, y) = \frac{\sum_{j=-1,1}\sum_{k=-1,1} i(x+j, y+k)W(x+j, y+k)}{\sum_{j=-1,1}\sum_{k=-1,1} W(x+j, y+k)} \quad (8)$$

where $$W(x+j, y+k) = \begin{cases} 1 & i(x+j, y+k) > T_3 \\ 0 & \text{otherwise} \end{cases} \quad (9)$$

Note that the same equation is applied to determine the replacement value if the problem location corresponds to a green photosite which is also a slow photosite. However, in this case:

$$W(x+j, y+k) = \begin{cases} 1 & i(x+j, y+k) < T_4 \\ 0 & \text{otherwise,} \end{cases} \quad (10)$$

where in the preferred embodiment, $T_4 = T_2$.

As another example, also in connection with the Bayer CFA pattern shown in FIG. 7B, if location i(x,y) is a problem photosite and (x,y) corresponds to a location of a red or blue photosite, then the replacement value i'(x,y) for the image signal i(x,y) is calculated in the following manner:

$$i'(x,y)=0.25*[i(x-2,y)+i(x+2,y)+i(x,y+2)+i(x,y-2)]. \quad (11)$$

When location (x,y) corresponds to a red or blue photosite and is also a fast photosite, the equation for determining the replacement value i'(x,y) may be generalized as follows:

$$i'(x, y) = \frac{\sum_{j=-2,0,2}\sum_{k=-2,0,2} i(x+j, y+k)W(x+j, y+k)}{\sum_{j=-2,0,2}\sum_{k=-2,0,2} W(x+j, y+k)} \quad (12)$$

where $$W(x+j, y+k) = \begin{cases} 1 & i(x+j, y+k) > T_3 \\ 0 & \text{otherwise} \end{cases} \quad (13)$$

Note that in this case, either j or k must be 0, but j and k are never both zero. Note also that the same equation is applied to determine the replacement value if the problem location corresponds to a red or blue photosite which is also a slow photosite. However, in this case $$W(x+j, y+k) = \begin{cases} 1 & i(x+j, y+k) < T_4 \\ 0 & \text{otherwise,} \end{cases} \quad (14)$$

where in the preferred embodiment, $T_4 = T_2$.

The interpolation scheme described above for the purpose of generating an image signal with an extended dynamic range from more than one sparsely sampled image signal may be modified by those skilled in the art. However, many such modifications to the above interpolation scheme may be derived and should not be considered as significant deviations of the present invention.

Those skilled in the art will recognize that the above interpolation scheme performed by the signal extender is a lowpass filter, which is well known in the art. Typically, the application of a lowpass filter to a image signal has a similar effect to reducing the resolution of the image signal. Thus, the processing performed by the DREFA processor 22 is a method by which the spatial resolution of the image sensing device 10 may be traded for dynamic range of the image sensing device 10. Indeed, those areas of an image where the interpolation scheme is implemented to increase the dynamic range of the signal appear noticeably softer (less sharp) than the image would have if that same area of the image had been captured by the sensor in such a fashion that no "problem locations" (as defined by the slow pixel thresholder 46 and the fast pixel thresholder 48) occur.

Figure 9:
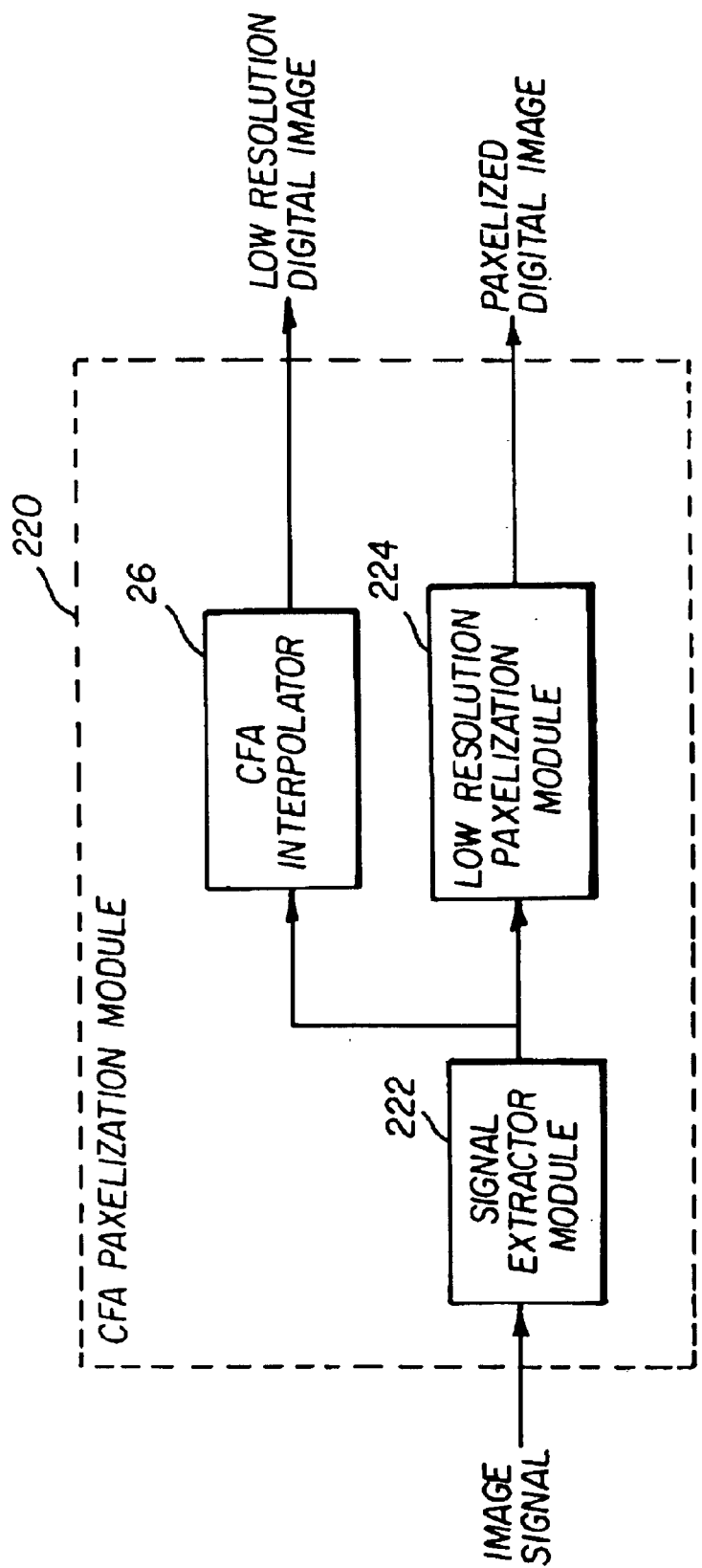
FIG. 9 Shows an exploded block diagram of the CFA paxelization module.

The CFA paxelization module 220 shown in FIG. 2 is illustrated in more detail in FIG. 9. The CFA paxelization module 220 receives an image signal either as unaltered from the A/D converter 14 or processed from the DREFA processor 22. The image signal is received by the signal extractor module 222 which assembles the pixel values of the image signal corresponding to the slow photosites to form a sparsely sampled digital image from the slow pixels. It is important to note that action taken by the signal extractor module 222 does not have to rearrange the storage of the pixel data in computer memory. The present invention implements the signal extractor module 222 as a pointer addressing scheme to the storage of the pixel data in computer memory.

Two image processing paths are employed by the CFA paxelization module 220. In the first image processing path the sparsely sampled slow digital image is received by the CFA interpolator 26 which produces a low resolution digital image from the input sparsely sampled slow digital image. The resultant low resolution digital image is a fully populated digital image with red, green blue pixel values defined for each slow photosite.

A second image processing path employed by the CFA paxelization module 220 employs a low resolution paxelization module 224, to perform a numerical averaging spatial filtering technique on the low resolution sparsely sampled slow digital image which results in a paxelized digital image. The paxelized digital image is also a low resolution digital image.

The image signal is received by the signal extractor module 222 which assembles the slow pixel values of the image into a sparsely sampled slow digital image. An example of a sparsely sampled slow digital image derived from the image signal produced with the CFA photosite pattern as illustrated in FIGS. 7A and 7B are shown in FIGS. 10A, 10B, and 10C.

FIG. 10A illustrates that all of the pixel locations of the green digital image channel are populated with values from the slow green pixels of the image signal. However, FIGS. 10B and 10C illustrate that every other column and every other row of the red and blue digital image channels have pixel locations which are unpopulated and must calculate with an interpolation method. It is important to note that the sparsely sampled slow digital image has half the number of rows and half the number of columns as the sparsely sampled high resolution digital image from which it is derived.

The CFA interpolator 26 receives the sparsely sampled slow digital image and calculates a low resolution digital image by using a method similar to the one disclosed by Adams et al. in U.S. Pat. No. 5,652,621, referenced above. The unpopulated pixel values for the red and blue digital image channels of the sparsely sampled slow digital image are interpolated using pixel values sampled in a small local neighborhood of pixels about a missing pixel. The only modification to the method described by Adams et al. is the omission of the interpolation of the green digital image channel pixel values since this digital image channel is already fully populated. The fully populated digital image resulting from applying the interpolation processing is referred to as the low resolution digital image. Less computational processing time is required to produce a low resolution digital image from the image sensor device 10 than is required if a low resolution digital image is derived from the source digital image as output from the CFA interpolator 26.

As described above, the low resolution paxelization module 224 shown in FIG. 9 receives the sparsely sampled slow digital and applies a block averaging technique, (a form of spatial filtering) to calculate a paxelized value for each block of pixel values. The paxelized digital image has dimensions which are related to the dimensions of the source digital image by a multiplicative integer value. For example, if the source digital image described above has 1536 by 2304 pixels, the sparsely sampled slow digital image would have 768 by 1152 pixels. Therefore with the block averaging technique, the resultant sizes of the paxelized digital images would be 384 by 576, 192 by 288, etc. Alternatively, arbitrary size paxelized digital images can be produced by using a bi-linear interpolation method as is known in the art. Alternatively, the low resolution digital image can be generated by the CFA paxelization module 220 directly from the high resolution digital image produced by the CFA interpolator 26.

Figure 11:
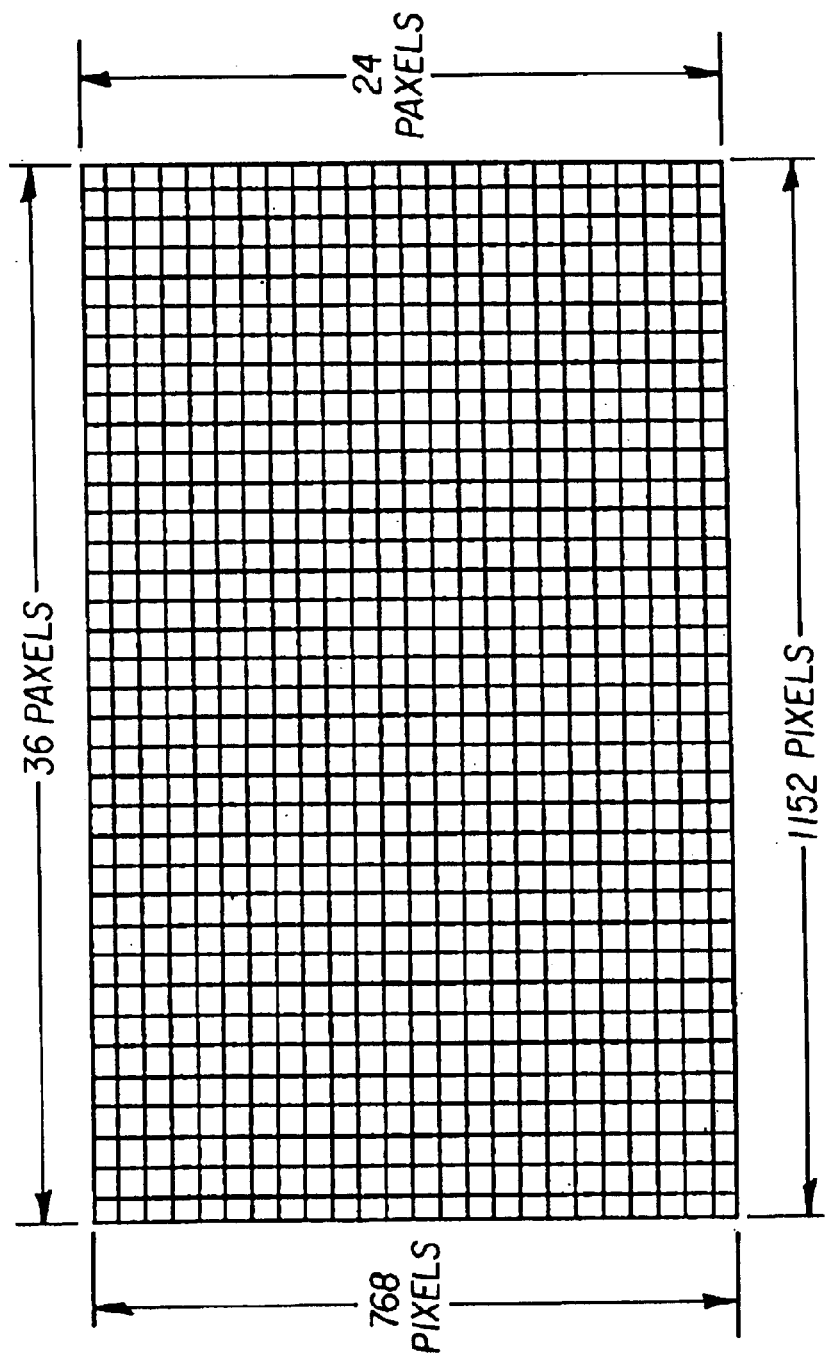
FIG. 11 shows an example of the low resolution arrangement of pixels for block averaging.

Referring to FIG. 10A, the green pixels locations of the sparsely sampled slow digital image are fully populated with pixel values. For a 2 by 2 block size, the pixel values in rows referenced by indices 0 to 1 and columns referenced by indices 0 to 1 will be averaged to produce a paxel value which will be the first green pixel value of the paxelized digital image. Referring to FIG. 10B, the red pixel locations of the sparsely sampled slow digital image are not fully populated with pixel values. Thus for a 2 by 2 block size, the pixel values $r_{01}$ and $r_{10}$ will be averaged to produce a paxel value which will be the first red pixel value of the paxelized digital image. The blue paxel values are calculated in similar manner. FIG. 11 represents a pictoral diagram of the block regions for a block size of 32 by 32 pixels which results in a paxelized digital image of size 24 by 36 paxels.

By using only the slow pixel values to produce the low resolution image, the image is produced with computational efficiency and with a minimum of saturation artifacts. Similarly, if the sparsely sample high resolution digital image does not contain significant saturation artifacts in the fast pixels, only the fast pixel values can be selected to form the low resolution digital image. This will also result in computational efficiency and minimize noise pixels in the low resolution image. Referring to FIG. 9, the signal extractor module 222 analyzes the fast and slow pixel values in a manner similar to the DREFA processor 22 and makes a selection of either the fast pixel values or the slow pixel values depending upon whether there are more saturated pixels or noise pixels in the sparsely sampled high resolution digital image. For improved computational efficiency, the signal extractor module 222 can use a subset of the pixels in the high resolution digital image.

Referring back to FIG. 2, the enhancement processor 240 receives a digital image and produces an enhanced high resolution digital image. Although there are many methods of enhancing digital images that can be used to advantage with the present invention, the preferred embodiment of the present invention produces an enhanced digital image that is preprocessed for sending to an output device such as a printer. Two transforms are used to prepare the digital image for direct printing. The first transform is a 3×3 color matrix transformation which is applied to the color pixels of the high resolution digital image. The color matrix transformation accounts for the difference between the spectral sensitivities of the color photosites of the image sensing device 10 and the spectral characteristics of the printing device. The method described above employed by the present invention is similar to the method taught in U.S. Pat. No. 5,189,511 issued Feb. 23, 1993 to Parulski et al. entitled Method and Apparatus for Improving the Color Rendition of Hardcopy Images from Electronic Cameras. The second transform involves the application of a tone scale function which maps the extended dynamic range pixel values of the source digital image to pixel values compatible with typical viewing devices. The present invention uses a similar method to the one described in U.S. Pat. No. 5,300,381 issued Apr. 5, 1994 to Buhr et al. entitled Color Image Reproduction of Scenes with Preferential Tone Mapping. Buhr describes a method of calculating a rendering tone scale function with preferential tone mapping in which the contrast of the tone scale function is greatest for midtone pixel intensities and has gracefully lower contrast for shadow and highlight pixel intensities. This rendering tone scale function is combined with a gamma mapping tone scale function to calculate a system tone scale function. The gamma mapping tone scale function compensates for the inherent intensity response of typical viewing devices. The system tone scale function is cascaded with the rendering tone scale function and applied (in the form of a look-up-table) to the pixels of the high resolution digital image resulting in an enhanced high resolution digital image.

The enhancement processor 240 can also be used to process the low resolution digital image. For digital camera applications an LCD display device is used to view digital images produced by the digital image processor 200. Specifically, according to one embodiment of the present invention, the system calculates a low resolution digital image and processes the low resolution digital image with the enhancement processor 240 shown in FIG. 2 to produce an enhanced low resolution digital image. The enhancement processor 240 in this embodiment uses a three by three matrix appropriate for an LCD display device. The enhanced low resolution digital image is displayed on the LCD display device 64 as shown in FIG. 1.

Returning to FIG. 1, as described above, the present invention can be practiced with several different methods of generating a low resolution digital image. The user can be allowed to select between these methods. For example, a message can be displayed on the LCD display device 64 which offers the user a choice between option (1) "fast and less accurate" and option (2) "slow and more accurate". The user makes a selection using a user selection device 62 such as depressing a button on the digital camera. If the user selects option (1) the paxelization embodiment is used to generate the low resolution image. Conversely, if the user selects option (2) the CFA interpolation embodiment is used to generate the low resolution image. The user can also be given the choice of selecting the spatial resolution of the low resolution digital image. Again the available spatial resolution options are displayed on the LCD display device 64. The user can select any of the options available in an independent manner from the selection of the method choices (1) and (2) as described above.

The invention has been described in detail with particular reference to certain preferred embodiments thereof, but it will be understood that variations and modifications can be effected within the spirit and scope of the invention. For example, the invention provides an image capture system that expands the dynamic range in both directions, i.e., that expands the response of the fast photosites to increased exposures by utilizing the image signals from neighboring slow photosites and expands the response of the slow photosites to decreased exposures by utilizing the image signals from neighboring fast photosites. It would be likewise feasible for the system to work on dynamic range from only one direction, i.e., to expand the response of only the fast photosites to increased light exposures by utilizing the image signals from neighboring slow photosites, or alternatively, to expand the response of only the slow photosites to decreased light exposures by utilizing the image signals from neighboring fast photosites.

PARTS LIST

1 lens
6 optical lowpass filter
10 image sensing device
14 A/D converter
22 DREFA processor
26 CFA interpolator
28 slow photosite
30 fast photosite
32 red slow photosite
34 green slow photosite
36 blue slow photosite
38 red fast photosite
40 green fast photosite
42 blue fast photosite
44 slow pixel equalizer
46 slow pixel thresholder
48 fast pixel thresholder
50 signal extender
51 lenslet
52 slow photosite location
53 color filter array
54 light blocking mask portion
55 photosensitive area
56 large aperture
57 small aperture
58 layer of neutral filters
59 neutral filter
62 user selection device
64 display device
200 digital image processor
220 CFA paxelization module
222 signal extractor module
224 low resolution paxelization module
240 enhancement processor

What is claimed is:

1. A method of producing a low resolution image from a sparsely sampled extended dynamic range digital image, comprising the steps of:

a) providing a sparsely sampled extended dynamic range image sensing device having fast photosites with a predetermined response to light exposure interspersed with slow photosites with a slower response to the same light exposure;

b) using the image sensor to produce a sparsely sampled high resolution digital image having fast pixel values produced by the fast photosites and slow pixel values produced by the slow photosites; and c) constructing a low resolution digital image from the sparsely sampled high resolution digital image by selecting only the slow pixel values or only the fast pixel values from the sparsely sampled high resolution digital image.

2. The method of claim 1, wherein the low resolution image is constructed by filtering the selected pixel values with an averaging spatial filter.

3. The method of claim 2, further including the step of displaying the low resolution digital image on the display of a digital camera.

4. A computer program for performing the method of claim 3.

5. A computer program for performing the method of claim 2.

6. The method of claim 1, wherein the sparsely sampled extended dynamic range image sensing device is a color image sensor having a color filter array, and the low resolution image is constructed by creating a low resolution sparsely sampled color digital image and filtering the low resolution sparsely sampled color digital image with an interpolation spatial filter to generate missing color pixel values of the low resolution sparsely sampled digital image.

7. A computer program for performing the method of claim 6.

8. The method of claim 1, wherein the selection between slow pixel values and fast pixel values is based on the relative presence of saturation in the fast pixel values and noise in the slow pixel values.

9. A computer program for performing the method of claim 8.

10. A computer program for performing the method of claim 1.

11. A method of producing a low resolution image from a sparsely sampled extended dynamic range image sensing device comprising the steps of:
   a) providing a camera having a sparsely sampled extended dynamic range image sensing device having fast photosites with a predetermined response to light exposure interspersed with slow photosites with a slower response to the same light exposure, and a display device;
   b) actuating the camera to produce a sparsely sampled high resolution digital image having fast pixel values produced by the fast photosites and slow pixel values produced by the slow photosites;
   c) displaying a message on the display device indicating a choice of two or more image resolution options;
   d) selecting an image resolution option; and
   e) constructing a low resolution digital image from the sparsely sampled high resolution digital image by selecting only the slow pixel values or only the fast pixel values from the sparsely sampled high resolution digital image in response to the selected image resolution option.

12. The method of claim 11, wherein the selection between slow pixel values and fast pixel values is based on the relative presence of saturation in the fast pixel values and noise in the slow pixel values.

13. A computer program for performing the method of claim 12.

14. The method claimed in claim 11, further comprising the steps of displaying a message indicating the choice of an image processing option, selecting a processing option, and constructing the low resolution digital image in response to the selected processing option.

15. A computer program for performing the method of claim 14.

16. The method of claim 11, wherein the low resolution image is constructed by filtering the selected pixel values with an averaging spatial filter.

17. The method of claim 16, further including the step of displaying the low resolution digital image on the display of a digital camera.

18. A computer program for performing the method of claim 17.

19. A computer program for performing the method of claim 16.

20. The method of claim 11, wherein the sparsely sampled extended dynamic range image sensing device is a color image sensor having a color filter array, and the low resolution image is constructed by creating a low resolution sparsely sampled color digital image and filtering the low resolution sparsely sampled color digital image with an interpolation spatial filter to generate missing color pixel values of the low resolution sparsely sampled digital image.

21. A computer program for performing the method of claim 20.

22. A computer program for performing the method of claim 11.

23. A system for producing a low resolution image from a sparsely sampled extended dynamic range digital image, comprising:
   a) a sparsely sampled extended dynamic range image sensing device having fast photosites with a predetermined response to light exposure interspersed with slow photosites with a slower response to the same light exposure for producing a sparsely sampled high resolution digital image having fast pixel values produced by the fast photosites and slow pixel values produced by the slow photosites; and
   b) means for constructing a low resolution digital image from the sparsely sampled high resolution digital image by selecting only the slow pixel values or only the fast pixel values from the sparsely sampled high resolution digital image.

24. The system of claim 23, wherein the low resolution image is constructed by filtering the selected pixel values with an averaging spatial filter.

25. The system of claim 24, further including means for displaying the low resolution digital image on the display of a digital camera.

26. The system of claim 23, wherein the sparsely sampled extended dynamic range image sensing device is a color image sensor having a color filter array, and the low resolution image is constructed by creating a low resolution sparsely sampled color digital image and filtering the low resolution sparsely sampled color digital image with an interpolation spatial filter to generate missing color pixel values of the low resolution sparsely sampled digital image.

27. The system of claim 23, wherein the selection between slow pixel values and fast pixel values is based on the relative presence of saturation in the fast pixel values and noise in the slow pixel values.

28. A system for producing a low resolution image from a sparsely sampled extended dynamic range image sensing device, comprising:
   a) a camera having a sparsely sampled extended dynamic range image sensing device having fast photosites with a predetermined response to light exposure interspersed with slow photosites with a slower response to the same light exposure for producing a sparsely sampled high resolution digital image having fast pixel values produced by the fast photosites and slow pixel values produced by the slow photosites and a display device;
   b) means for displaying a message on the display device indicating a choice of two or more image resolution options;

c) means for selecting an image resolution option; and d) means for constructing a low resolution digital image from the sparsely sampled high resolution digital image by selecting only the slow pixel values or only the fast pixel values from the sparsely sampled high resolution digital image in response to the selected image resolution option.

29. The system claimed in claim 28, further comprising means for displaying a message indicating the choice of an image processing option, means for selecting a processing option, and means for constructing the low resolution digital image in response to the selected processing option.

30. The system of claim 28, wherein the low resolution image is constructed by filtering the selected pixel values with an averaging spatial filter.

31. The system of claim 30, further including means for displaying the low resolution digital image on the display device of the digital camera.

32. The system of claim 28, wherein the selection between slow pixel values and fast pixel values is based on the relative presence of saturation in the fast pixel values and noise in the slow pixel values.

33. The system of claim 28, wherein the sparsely sampled extended dynamic range image sensing device is a color image sensor having a color filter array, and the low resolution image is constructed by creating a low resolution sparsely sampled color digital image and filtering the low resolution sparsely sampled color digital image with an interpolation spatial filter to generate missing color pixel values of the low resolution sparsely sampled digital image.

* * * * *